March 15, 1966  H. M. ALEXANDER ET AL  3,240,580
GLASS POLISHING COMPOSITIONS OF RARE EARTH NITRATES
Filed April 3, 1961
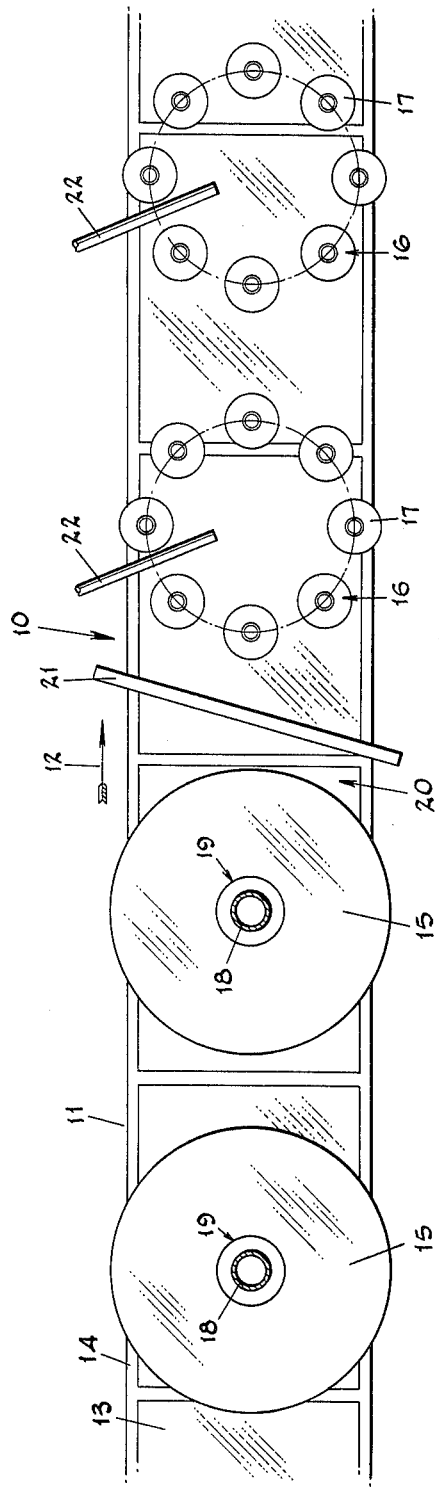
INVENTORS
Harold M. Alexander and
BY Joseph D. Ryan
Nobbe & Swope
ATTORNEYS

United States Patent Office 3,240,580
Patented Mar. 15, 1966

3,240,580
GLASS POLISHING COMPOSITIONS OF RARE EARTH NITRATES
Harold M. Alexander and Joseph D. Ryan, Toledo, Ohio, assignors to Libbey-Owens-Ford Glass Company, Toledo, Ohio, a corporation of Ohio
Filed Apr. 3, 1961, Ser. No. 100,052
6 Claims. (Cl. 51—309)

The present invention relates broadly to the surfacing of plate glass and more particularly to a novel method and composition for polishing the previously ground surfaces of a plate glass blank or ribbon.

As is well known, plate glass is produced commercially by first rough forming a more or less continuous ribbon from a mass of molten glass and then surfacing one or both sides thereof while the glass, either as a ribbon or as individual blanks that have been cut therefrom, is moved continuously along a predetermined path. During such surfacing the glass is passed first through a grinding area and then through a polishing area. In the grinding area, at least one surface is subjected to the abrasive action of sand of progressively decreasing coarseness under heavy iron runners; and in the polishing area the previously ground surface is polished with rouge under relatively soft pads such as wool or hair felt.

This polishing with rouge (iron oxide), in a water slurry and with copperas added, has been practiced in the plate glass industry for a great many years and, until very recently, it has remained the conventional and most generally accepted method of polishing previously ground plate glass blanks although various other polishing materials and mixtures have been suggested and tried from time to time in an effort to obtain faster and/or better controlled polishing.

For example, cerium oxide is well known as a polishing agent in the optical glass industry, but has never been considered applicable to the commercial polishing of plate glass; first, because of its relatively high cost as compared with iron oxide; and, second, because it often produces a dull surface effect on the finished glass by reason of a characteristically cloudy film which it leaves and which, once formed, is very difficult to remove.

However we have found that, by the use of a special additive, cerium oxide may be advantageously used as the principal ingredient in a novel polishing composition to obtain notably improved results in the final finishing of plate glass.

In laboratory polishing tests, conducted with ground plate glass blanks and using conventional wool and hair felt polishing tools, we have found that the composition of this invention is capable of polishing approximately one and one-half times as fast as the conventional rouge-copperas-water slurry under the same conditions and that, at the same time, it will produce a bright, clear and highly transparent polished surface.

Briefly stated, the invention contemplates the improved polishing of previously ground plate glass blank surfaces with conventional soft polishing tools and a special slurry made up essentially of cerium oxide, a mixture of rare earth nitrates and water.

The invention further contemplates using a treated by-product of a commercial recovery procedure as one source of the mixture of rare earth nitrates that forms an essential and, indeed, the novel ingredient of the new polishing composition.

It is therefore a primary object of this invention to provide a novel method of polishing plate glass blanks to obtain an improved finish, and in a shorter time than has heretofore been considered possible.

Another object is the provision for use in such a method of a novel and improved composition of polishing materials.

Still another object is to provide a relatively inexpensive additive material that will overcome the defects and improve the polishing action of cerium oxide-water slurries.

Other objects and advantages of the invention will become more apparent during the course of the following description when taken in connection with the accompanying drawings.

In the drawings, wherein like numerals are employed to designate like parts throughout the same:

The single figure is a fragmentary, diagrammatic, plan view of a continuous grinding and polishing line upon which the method of the invention may be practiced.

Referring now more particularly to these drawings, there is designated generally by the numeral 10 a conventional type of plate glass grinding and polishing line that is made up of a series of tables 11 mounted for continuous horizontal movement in the direction of the arrow 12 and adapted to receive a series of plate glass blanks 13 arranged in end-to-end relation and embedded in a layer of plaster 14 on the tables.

As the tables 11 are moved forwardly, the glass sheets carried thereby will be moved, first beneath a series of rotating grinding tools 15, and then beneath a series of rotating polishing runners 16 each of which includes a plurality of felt covered polishing tools 17 mounted for independent rotary movement on their own axes.

During passage of the glass sheets beneath the grinding runners 15, a mixture of sand and water is fed between the runners and the glass through a conduit 18 in the shaft 19 of the runner; and, as the glass passes through the area 20, between the grinding runners 15 and the polishing runners 16, the sand and water employed during the grinding action is removed from the glass surface by means of suitable squeegees 21 or the like. During subsequent passage beneath the polishing tools 16, the polishing composition of the invention is fed onto the glass surface and between the polishing tools and the glass. This may be done in any suitable manner, such as by means of pipes or hoses 22.

As indicated above, the special composition of the invention comprises a slurry of cerium oxide and water to which there has been added a mixture of rare earth nitrates. Obviously individual rare earth nitrates can be obtained in more or less commercially pure form and mixed as desired. Also mixtures of rare earth elements and rare earth compounds are found in nature and at least some of these can be treated to make them suitable for use in the polishing composition of this invention.

Generally speaking, the principal requirement for the mixture of rare earth nitrates to be used as the additive in our special cerium oxide-water polishing composition is that it contain cerous nitrate as the principal ingredient. Lanthanum nitrate and neodymium nitrate have also been found to be satisfactory as additional major ingredients and good results have been obtained with praseodymium nitrate, samarium nitrate, gadolinium nitrate and yttrium nitrate present as minor ingredients in the mixture, as well as other rare earth nitrates in trace or minor amounts. Materials other than the rare earth nitrates may also be tolerated in small amounts as impurities.

Consequently, the addition mixture of the invention can be readily made up from individual ingredients or from combinations of the required, desired or permissible components or by suitable treatment of naturally occurring mixtures which include the required rare earths or compounds thereof.

As an example of the latter procedure, monazite sand is probably the best source of the rare earths, and the recovery of thorium from monazite sand is a recognized commercial procedure which leaves as one byproduct a mixture of rare earth salts that can be treated, for example with nitric acid, to give a mixture of rare earth nitrates.

Such a rare earth nitrate mixture from at least one commercial source has the following approximate composition:

| | Percent |
|---|---|
| $Ce(NO_3)_3 \cdot 6H_2O$ | 48.4 |
| $La(NO_3)_3 \cdot 6H_2O$ | 25.5 |
| $Nd(NO_3)_3 \cdot 6H_2O$ | 17.7 |
| $Pr(NO_3)_3 \cdot 6H_2O$ | 5.1 |
| $Sm(NO_3)_3 \cdot 6H_2O$ | 3.06 |
| $Gd(NO_3)_3 \cdot 6H_2O$ | 2.0 |
| $Y(NO_3)_3 \cdot 6H_2O$ | .34 |

It will be seen that cerous nitrate predominates in this mixture; that cerous nitrate, lanthanum nitrate and neodymium nitrate are the major constitutents while praseodymium nitrate, samarium nitrate and yttrium nitrate are present in minor amounts. There may also be traces of such other rare earth nitrates as thulium nitrate, holmium nitrate and dysprosium nitrate and other materials as impurities in very minor or trace amounts.

The above addition mixture, derived from treating a naturally occurring mixture of rare earth compounds and containing approximately 48.4% cerous nitrate, may be said to be representative of the type of rare earth nitrate mixtures we have used although it should be appreciated that considerable variations in the percentages of the various ingredients can be accepted without materially affecting the results. For example, we have determined that a predominance of cerous nitrate in the mixture of rare earth nitrates is very important but we have worked successfully with mixtures in which the amount of cerous nitrate has varied from 36.06% to 90.20%. Nevertheless further experiments indicate that the cerous nitrate content of the rare earth nitrate mixture should not fall below 35% for commercially desirable results.

In employing the composition of the invention for the continuous polishing of plate glass, our best work has been done with a relatively dilute slurry made up with 100 parts by weight of water, from one to 10 parts cerium oxide and from 0.5 to 5 parts of the mixture of rare earth nitrates. However, for all-around use excellent results may be had with a composition made up of 100 parts by weight of water, from one to 60 parts of cerium oxide and from 0.5 to 10 parts of the rare earth nitrate mixture.

Surprisingly enough we have found that the presence of the mixture of rare earth nitrates in the indicated amounts notably improves the normal polishing efficiency of the cerium oxide in the water slurry. Moreover, it prevents formation of the cloudy film that has heretofore presented a very serious problem when cerium oxide was employed in the dilute slurries that have to be used for production line polishing of plate glass blanks.

In the following example there is listed a preferred composition of the special polishing slurry of the invention.

*Example I*

| | Parts |
|---|---|
| Water | 100 |
| Cerium oxide | 6 |
| Mixture of rare earth nitrate hexahydrates | 0.95 |

A modified but similar composition is listed in the following example:

*Example II*

| | | |
|---|---|---|
| Water | gals | 500 |
| Cerium oxide | lbs | 250 |
| Mixture of rare earth nitrate hexahydrates | | 40 |

It will be noted that the mixture of rare earth nitrates content in the above compositions and examples has been expressed in terms of the rare earth nitrate hexahydrates. This is because we have found the hexahydrates the most convenient and easily used form of the rare earth nitrates.

Obviously, however, rare earth nitrates may be introduced into the polishing composition in other ways and when this is done it may necessitate a simple calculation based on the values set forth above to determine the amount of any different compounds used to introduce the rare earth nitrates.

It is to be understood that the forms of the invention herewith shown and described are to be taken as illustrative embodiments only of the same, and that various changes in the number, order of addition and character of ingredients, as well as various procedural changes may be resorted to without departing from the spirit of the invention as defined in the subjoined claims.

We claim:

1. In a method of finishing a glass surface, the step of rubbing a slurry of water, cerium oxide and a mixture of rare earth nitrates containing at least 35% cerous nitrate and at least 10% other rare earth nitrates, in the proportions of 100 parts by weight of water, from 1 to 60 parts by weight of cerium oxide and from 0.5 to 10 parts by weight of the mixture of rare earth nitrates, over said surface with a soft tool.

2. In a continuous method of finishing a ground surface of a plate glass blank, the steps of moving said surface along a fixed path and during said movement rubbing said ground surface with a slurry of water, cerium oxide and a mixture of rare earth nitrate hexahydrates containing between approximately 35% and approximately 90% of cerous nitrate hexahydrate, in proportions of 100 parts by weight of water to from 1 to 10 parts by weight of cerium oxide and from 0.5 to 5 parts by weight of the mixture of rare earth nitrate hexahydrates, over said surface with a relatively soft tool.

3. A composition for use in polishing glass consisting essentially of water, cerium oxide and a mixture of rare earth nitrates containing at least 35% of cerous nitrate and at least 10% other rare earth nitrates in proportions of 100 parts by weight of water, from 1 to 60 parts of cerium oxide and from 0.5 to 10 parts by weight of a mixture of the rare earth nitrates.

4. A method as defined in claim 1 in which the mixture of rare earth nitrates contains a predominant amount of cerous nitrate together with intermediate amounts of lanthanum nitrate and neodymium nitrate and minor amounts of praseodymium nitrate, samarium nitrate, gadolinium nitrate and yttrium nitrate.

5. In a method of finishing a glass surface, the step of rubbing a slurry of 100 parts by weight of water, from 1 to 60 parts by weight of cerium oxide and from 0.5 to 10 parts by weight of a mixture of rare earth nitrates having substantially the following composition:

| | Percent |
|---|---|
| $Ce(NO_3)_3 \cdot 6H_2O$ | 48.4 |
| $La(NO_3)_3 \cdot 6H_2O$ | 25.5 |
| $Nd(NO_3)_3 \cdot 6H_2O$ | 17.7 |
| $Pr(NO_3)_3 \cdot 6H_2O$ | 5.1 |
| $Sm(NO_3)_3 \cdot 6H_2O$ | 3.06 |
| $Gd(NO_3)_3 \cdot 6H_2O$ | 2.0 |
| $Y(NO_3)_3 \cdot 6H_2O$ | .34 | over said surface with a soft tool.

6. A composition for use in polishing glass consisting essentially of 100 parts by weight of water, from 1 to 60 parts of cerium oxide and from 0.5 to 10 parts by weight of a mixture of rare earth nitrates having substantially the following composition:

| | Percent |
|---|---|
| $Ce(NO_3)_3 \cdot 6H_2O$ | 48.4 |
| $La(NO_3)_3 \cdot 6H_2O$ | 25.5 |
| $Nd(NO_3)_3 \cdot 6H_2O$ | 17.7 |
| $Pr(NO_3)_3 \cdot 6H_2O$ | 5.1 |
| $Sm(NO_3)_3 \cdot 6H_2O$ | 3.06 |
| $Gd(NO_3)_3 \cdot 6H_2O$ | 2.0 |
| $Y(NO_3)_3 \cdot 6H_2O$ | .34 |

(References on following page)

References Cited by the Examiner

UNITED STATES PATENTS

| | | | |
|---|---|---|---|
| 2,554,070 | 5/1951 | Stead | 51—283 |
| 2,597,182 | 5/1952 | Rickner et al. | 51—283 |
| 2,744,001 | 5/1956 | Harman et al. | 51—308 |
| 2,816,824 | 12/1957 | Wilansky | 51—308 |
| 2,955,031 | 10/1960 | Bliton et al. | 51—308 |
| 3,071,455 | 1/1963 | Harman et al. | 51—308 |
| 3,097,083 | 7/1963 | Silvernail | 51—307 |

ALEXANDER H. BRODMERKEL, *Primary Examiner.*

JOSEPH REBOLD, LESLIE H. GASTON, MORRIS LIEBMAN, *Examiners.*